(12) United States Patent
Chaudhuri et al.

(10) Patent No.: US 10,924,587 B1
(45) Date of Patent: Feb. 16, 2021

(54) LIVE MIGRATION FOR HIGHLY AVAILABLE DATA STORES

(71) Applicant: Amazon Technologies, Inc., Seattle, WA (US)

(72) Inventors: Abhijit Chaudhuri, Bangalore (IN); Mahesh H. Dhabade, Bangalore (IN); Ameya Shrinivas Sakhalkar, Pune (IN); Visakh Sakthidharan Nair, Bangalore (IN); Vinesh Reddy Sunku, Khammam (IN); Preeti Gupta, Bangalore (IN); Sonia Goyal, New Delhi (IN); Rahul Kamalkishore Agrawal, Bangalore (IN); Shashank Vilas Likhite, Pune (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/401,039

(22) Filed: May 1, 2019

(51) Int. Cl.
*H04L 29/08* (2006.01)
*G06F 16/21* (2019.01)

(52) U.S. Cl.
CPC .......... *H04L 67/327* (2013.01); *G06F 16/214* (2019.01)

(58) Field of Classification Search
CPC ............................ H04L 67/327; G06F 16/214
See application file for complete search history.

(56) References Cited

U.S. PATENT DOCUMENTS

| | | | |
|---|---|---|---|
| 8,880,477 B2 | 11/2014 | Barker et al. | |
| 9,607,020 B1* | 3/2017 | Bosco | G06F 11/2058 |
| 9,792,321 B2 | 10/2017 | Buehne et al. | |
| 9,805,071 B1* | 10/2017 | Ellis | G06F 16/214 |
| 9,881,035 B2 | 1/2018 | Engelko et al. | |
| 9,927,992 B2* | 3/2018 | Driesen | G06F 3/067 |
| 9,984,101 B2 | 5/2018 | Meder | |
| 10,089,027 B2* | 10/2018 | Hashimoto | G06F 3/0653 |
| 10,185,727 B1 | 1/2019 | Wilton et al. | |
| 10,187,466 B2 | 1/2019 | Sanderson | |
| 10,191,922 B2 | 1/2019 | Michael et al. | |
| 10,268,633 B2 | 4/2019 | Mohanty et al. | |
| 2012/0137098 A1* | 5/2012 | Wang | G06F 3/0647 711/165 |
| 2015/0254015 A1* | 9/2015 | Seo | G06F 3/0685 711/103 |
| 2017/0061027 A1* | 3/2017 | Chesla | G06F 16/955 |

\* cited by examiner

*Primary Examiner* — Michael A Keller
*Assistant Examiner* — Jsing Forng Lin
(74) *Attorney, Agent, or Firm* — Robert C. Kowert; Kowert, Hood, Munyon, Rankin & Goetzel, P.C.

(57) ABSTRACT

Methods, systems, and computer-readable media for live migration for highly available data stores are disclosed. Migration of a data set from a first data store to a second data store is initiated and comprises a backfill of records to the second data store. During a window of time before the migration is complete, a read request for a first record is received. A response representing an authoritative version of the first record is generated using a copy of the first record in the first data store and a copy of the first record in the second data store. A write request for a second record is received during the window of time. A lock is acquired for the second record, and the write request is performed using a copy of the second record in the first data store and a copy of the second record in the second data store.

20 Claims, 13 Drawing Sheets

LIVE MIGRATION FOR HIGHLY AVAILABLE DATA STORES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. For example, in a distributed system, a variety of storage services may be provided for storing data sets on behalf of clients. Storage services may vary in their performance, availability, storage capacity, cost, and other characteristics. In some circumstances, a client may seek to migrate a data set from one storage service to another. Prior approaches to migration often required outages during which the data set was inaccessible by client applications for the duration of the outage.

Figure 1:
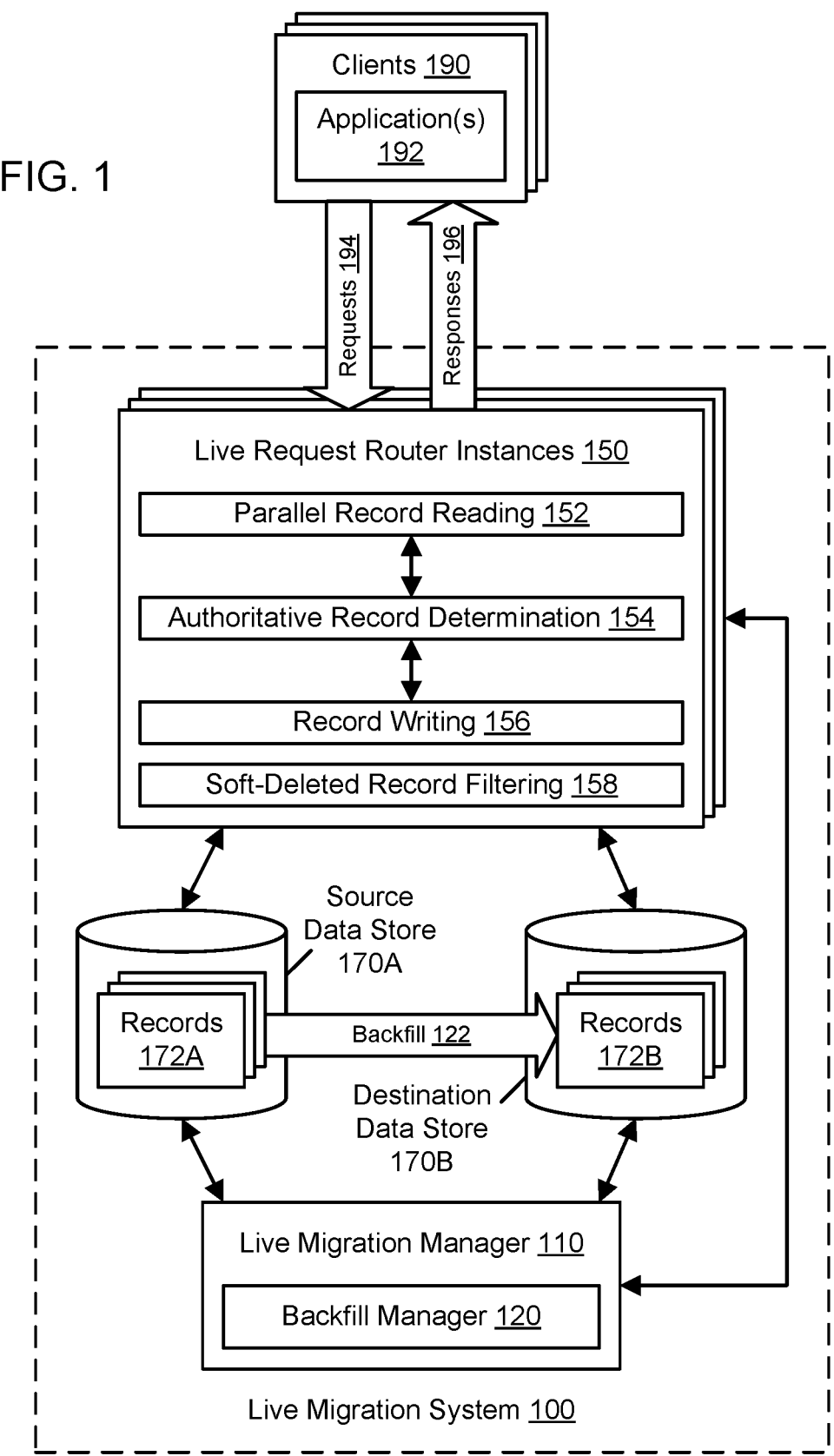
FIG. 1 illustrates an example system environment for live migration for highly available data stores, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for live migration for highly available data stores are described. A live migration system may enable migration of data sets between data stores while the data sets remain accessible to clients (e.g., for reads, writes, and deletes). A client of the live migration system may request migration of a data set from a source data store to a destination data store. The data stores may vary in their performance, availability, storage capacity, and/or other characteristics, and the migration may seek to take advantage of such characteristics offered by the destination data store. Prior approaches to migration often required outages during which the data set was inaccessible by client applications for the duration of the outage. The live migration system may include a fleet of routers that receive and process read requests, write requests, and delete requests during the migration so that an outage need not be taken. The live migration may include a backfill of existing records from the source to the destination, after which the authoritative version of the data set may be flipped from the source to the destination on a router-by-router basis. At some stages of the migration, such as during the window of time of the authority flip, a router may read from both the source and destination in order to determine the authoritative version of a requested record. At some stages of the migration, requests to delete records may be implemented using "soft" deletion by marking the records for deletion but leaving them in place, and a read request may identify a record as not found if at least one version of the record has the soft-deletion metadata. By performing soft deletion, the live migration system may enable rollbacks from the destination to the source without a time-consuming reverse backfill. Using the techniques described herein, data sets may be migrated between data stores while minimizing or eliminating application downtime and also permitting efficient rollbacks until a late stage of the migration.

As one skilled in the art will appreciate in light of this disclosure, embodiments may be capable of achieving certain technical advantages, including some or all of the following: (1) improving the availability of a data store by continuing to process live requests from applications during migration of a data set to or from that data store; (2) eliminating downtime for an application that seeks to read from or write to a data set involved in a migration; (3) improving the speed of a migration rollback by "soft" deleting records using metadata indicating that the records are marked for deletion while leaving the records in the source data store; (4) reducing network usage associated with a migration rollback by eliminating the need for a reverse backfill from the destination to the source; and so on.

FIG. 1 illustrates an example system environment for live migration for highly available data stores, according to some embodiments. A live migration system 100 may enable a data set to be migrated from one data store (a source 170A) to another data store (a destination 170B) while permitting reads, writes, and deletes from client applications 192 during the migration via a set of routers 150. The live migration system 100 may minimize or eliminate application 192 downtime. The live migration system 100 may maintain the high availability of the source data store 170A and/or destination data store 170B during a migration. A plurality of data stores such as the source data store 170A and destination data store 170B may each offer storage of records, potentially using different underlying storage technologies, architectures, and/or resource types to store data. The data stores 170A-170B may be accessible via different application programming interfaces (APIs). The data stores 170A-170B may be hosted in the same or different geographical regions or network zones. In one embodiment, the data stores 170A-170B may include NoSQL data stores. In one embodiment, the data stores 170A-170B may include non-relational key-value data stores that store key-value pairs. In one embodiment, the data stores 170A-170B may include relational data stores.

Components of the live migration system 100, such as a live migration manager 110 and a fleet of live request routers 150, may be used during migrations but may not be used by client applications 192 when migrations are not active. In one embodiment, an application 192 may be modified (e.g., by developers associated with the client) in order to use application programming interfaces (APIs) associated with the destination data store 170B. In one embodiment, as part of the migration, an application 192 may be modified to provide data requests 194 (e.g., reads, writes, and deletes) to the router instances 150 as an endpoint rather than to the source data store 170A or destination data store 170B. The routers 150 may supply responses 196 to those requests back to the appropriate application 192. When the migration is complete, the application may be modified again to provide requests to the destination data store 170B as an endpoint. If the migration is rolled back, the application may be modified instead to provide requests to the source data store 170A.

The live migration system 100 may ensure data accuracy in a migration. For example, the live migration system 100 may use locked writes to prevent concurrent write requests from placing a given record in an erroneous state. In some embodiments, the live migration system 100 may prioritize availability over latency. In some embodiments, the live migration system 100 may ensure the continued availability of a data set by minimally increasing latency for reads, writes, and/or deletes at some stages of a migration. The live migration system 100 may keep both the source 170A and destination data stores 170B up-to-date in order to perform efficient rollbacks without a reverse migration, if necessary. For example, a client may initiate a rollback at a late stage of the migration upon observing that the performance characteristics of the destination data store 170B are insufficient to meet expectations.

The live migration system 100 may include a live migration manager 110 that controls aspects of a migration from the source 170A to the destination 170B. In one embodiment, the live migration manager 110 may include a backfill manager 120 that performs a backfill 122 of existing records from the source 170A to the destination 170B. The backfill manager 120 may include components for extracting existing records 172A from the source 170A, transforming the extracted data into a format or schema required by the destination 170B, and loading the transformed records 172B into the destination 170B. Transformations may be performed according to predefined data type mappings and/or client-specified mappings. In one embodiment, the live migration manager 110 may perform an additional backfill near the end of the migration to ensure that updates to the source data store 170A since the initial backfill have been properly replicated to the destination data store 170B. The updates in the second backfill may result from live requests to write records and/or delete records during the migration. A final backfill may also ensure that updates are properly reflected in the destination data store 170B even if the updates were unsuccessfully propagated using an asynchronous update handler. In one embodiment, a data reconciler component may be continuously running from the start of the migration to ensure that records in the destination data store 170B have versions greater than or equal to the corresponding records in the source data store 170A. The data reconciler component may ensure that no records have been excluded from the migration.

At some point during a migration, the authoritative data store for a given data set may be switched from the source 170A to the destination 170B in a process referred to as an authority flip. The authority flip may be implemented on a router-by-router basis across the router fleet 150, e.g., by the live migration manager 110. Because it may not be feasible to perform the authority flip across all the routers in an atomic manner without taking an outage, the routers may be gradually flipped on an individual basis to ensure that an outage need not be taken for the data set being migrated. The gradual authority flip may be implemented over a window of time. During this window of time, both the source and destination data stores may be consulted by a router instance for some types of requests. For example, to process a read request for a particular record, a router may read the record from both data stores and return the authoritative version of the record. To implement this functionality, each of the router instances 150 may include a component for parallel record reading 152 and a component for authoritative record determination 154. Similarly, writes may be performed in the authoritative data store and may use locks to prevent concurrent access to records. To implement this functionality, each of the router instances 150 may include a component for record writing 156. Deletes may be implemented as "soft" deletes such that records are retained but marked for deletion (until the migration is completed). Records may be soft-deleted in this manner to enable efficient rollbacks of the migration, e.g., without requiring an expensive backfill from the destination data store back to the source data store. Read requests may filter such soft-deleted records and return "record not found" responses as if the records had actually been deleted, even if the soft deletion has not been propagated to the non-authoritative (secondary) data store. To implement this functionality, each of the router instances 150 may include a component for soft-deleted record filtering 158.

In one embodiment, a router 150 may determine the most recent (newer) version of a record and process a request accordingly. In one embodiment, versioning may be indicated using a version inserted by the routers 150 (if not already inserted by clients 190). The version may be time-based, such that higher version numbers indicate more recent modification times. Depending on the capabilities of the data store, the version may be inserted using a header to a record or using an attribute in the payload. The routers 150 may implement conditional writes based (at least in part) on the version of the record to ensure that a newer version is not overwritten. In one embodiment, routers may generally update the authoritative (primary) data store first before the update is asynchronously replicated to the non-authoritative (secondary) data store. However, because routers may differ in terms of which data store is considered authoritative during the window of time in which the authority flip is being propagated through the router fleet, routers may also check to see if the secondary data store has a newer version of a given record, and if so, may copy that newer version to the primary data store before performing the requested write.

In some embodiments, the data stores 170A-170B may use persistent storage resources such as hard disk drives, solid-state drives, and so on. The data stores 170A-170B may each offer storage in a manner independent of others of the data stores. The data stores 170A-170B may use different underlying storage technologies, architectures, and/or resource types to store data. The data stores 170A-170B may be accessible via different application programming interfaces (APIs). For example, data objects may be added to data store 170A via a first set of one or more APIs, and data objects may be added to data store 170B via a second set of one or more APIs that differ in some way from the first set. The data stores 170A-170B may be hosted in the same or different geographical regions. In some embodiments, the data stores 170A-170B may be maintained by different business entities or service providers. In some embodiments, the data stores 170A-170B may be maintained by different divisions within a single business entity or enterprise.

In one embodiment, any of the data stores 170A-170B may represent a distributed hash table (DHT). In one embodiment, the data stores 170A-170B may include non-relational key-value data stores (e.g., NoSQL stores) that store key-value pairs. In one embodiment, the data stores 170A-170B may include relational data stores. In order to be usable with the system 100, the data stores 170A-170B may satisfy a minimal set of requirements, such as offering APIs for getting a value by key, putting a value by key, conditionally putting a value by key, and deleting a key-value pair. The data stores 170A-170B may differ in their performance characteristics. For example, one data store may represent a hot storage tier with lower latency, while another data store may represent a cold storage tier with higher latency but lower cost and a longer storage window. In one embodiment, one or more of the data stores 170A-170B may represent a hosted data storage solution offering security, speed, availability, reliability, and scalability. In one embodiment, one or more of the data stores 170A-170B may be offered as a storage service available to many clients (internal to an enterprise and/or external to the enterprise). The data stores 170A-170B may scale to handle a very large amount of data, and a fleet of hosts that implement the routers 150 may also scale to handle such data.

The live migration system 100 may be implemented using one or more services. Each of the services may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. This modularity may enable services to be reused in order to build various applications through a process referred to as orchestration. A service may include one or more components that may also participate in the distributed system, e.g., by passing messages to other services or to other components within the same service. A service may offer one or more application programming interfaces (APIs) or other programmatic interfaces through which another service may request the functionality of the service. Components of the live migration system 100, such as the live migration manager 110 and/or live request routers 150, may be configured to process requests from various internal or external systems, such as client computer systems 190 or computer systems consuming networked-based services (e.g., web services). For instance, an application 192 on a client computer system 190 may submit a request to read a record from the data set being migrated. Services may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP).

Figure 11:
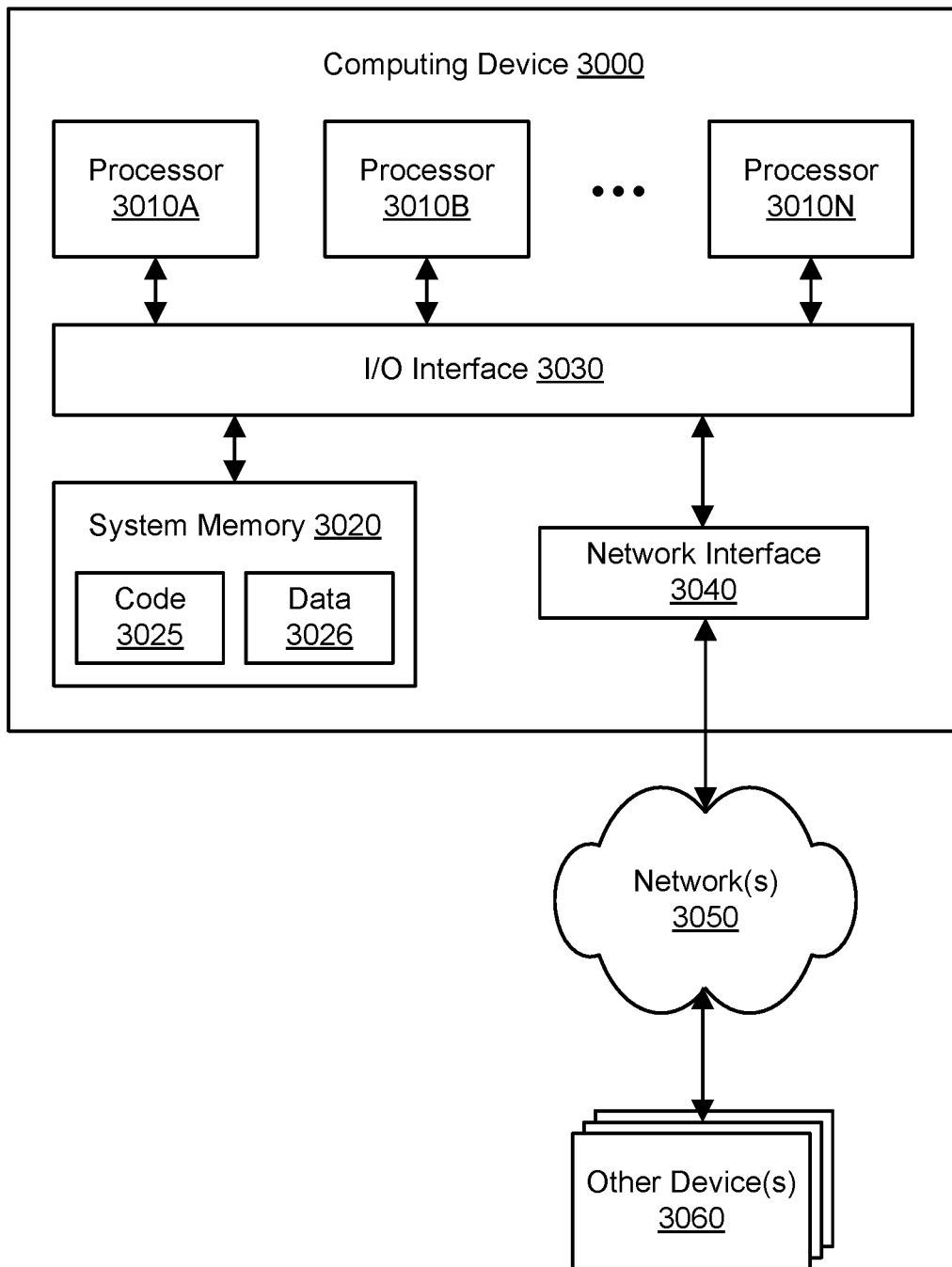
FIG. 11 illustrates an example computing device that may be used in some embodiments.

The live migration system 100 may include one or more computing devices, any of which may be implemented by the example computing device 3000 illustrated in FIG. 11. In various embodiments, the functionality of the different services, components, and/or modules of the live migration system 100 may be provided by the same computing device or by different computing devices. If any of the various components are implemented using different computing devices, then the respective computing devices may be communicatively coupled, e.g., via a network. Each of the components of the live migration system 100 may represent any combination of software and hardware usable to perform their respective functions, as discussed as follows. Functions implemented by the live migration system 100 may be performed automatically, e.g., without a need for user initiation or user intervention after an initial configuration stage, and programmatically, e.g., by execution of program instructions on at least one computing device. In one embodiment, aspects of the live migration system 100, such as the parallel record reading 152, may be performed repeatedly over time. The live migration system 100 may include additional components not shown, fewer components than shown, or different combinations, configurations, or quantities of the components shown.

The router fleet 150 may be implemented using a plurality of different instances that are distributed throughout one or more networks, and each instance may offer access to the functionality of a live request router to various clients 190. An individual one of the routers 150 may be implemented using one host or a plurality of hosts, any of which may be implemented by the example computing device 3000 illustrated in FIG. 11. Similarly, any of the data stores 170A-170B may represent one or more service instances and may be implemented using one host or a plurality of hosts, any of which may be implemented by the example computing device 3000 illustrated in FIG. 11. The hosts may be located in any suitable number of data centers or geographical locations. In one embodiment, multiple services and/or instances of the same service may be implemented using the same host.

It is contemplated that any suitable number and configuration of clients 190 may interact with the services of the live migration system 100. Components shown in FIG. 1 may convey network-based service requests to one another via one or more networks. In various embodiments, the network(s) may encompass any suitable combination of networking hardware and protocols necessary to establish network-based communications between two services. For example, the network(s) may generally encompass the various telecommunications networks and service providers that collectively implement the Internet. The network(s) may also include private networks such as local area networks (LANs) or wide area networks (WANs) as well as public or private wireless networks. The network(s) may include the hardware (e.g., modems, routers, switches, load balancers, proxy servers, etc.) and software (e.g., protocol stacks, accounting software, firewall/security software, etc.) necessary to establish a networking link between a first component and the Internet as well as between the Internet and a second component. In some embodiments, components may communicate with one another using a private network rather than the public Internet.

In one embodiment, aspects of the live migration system 100 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2:
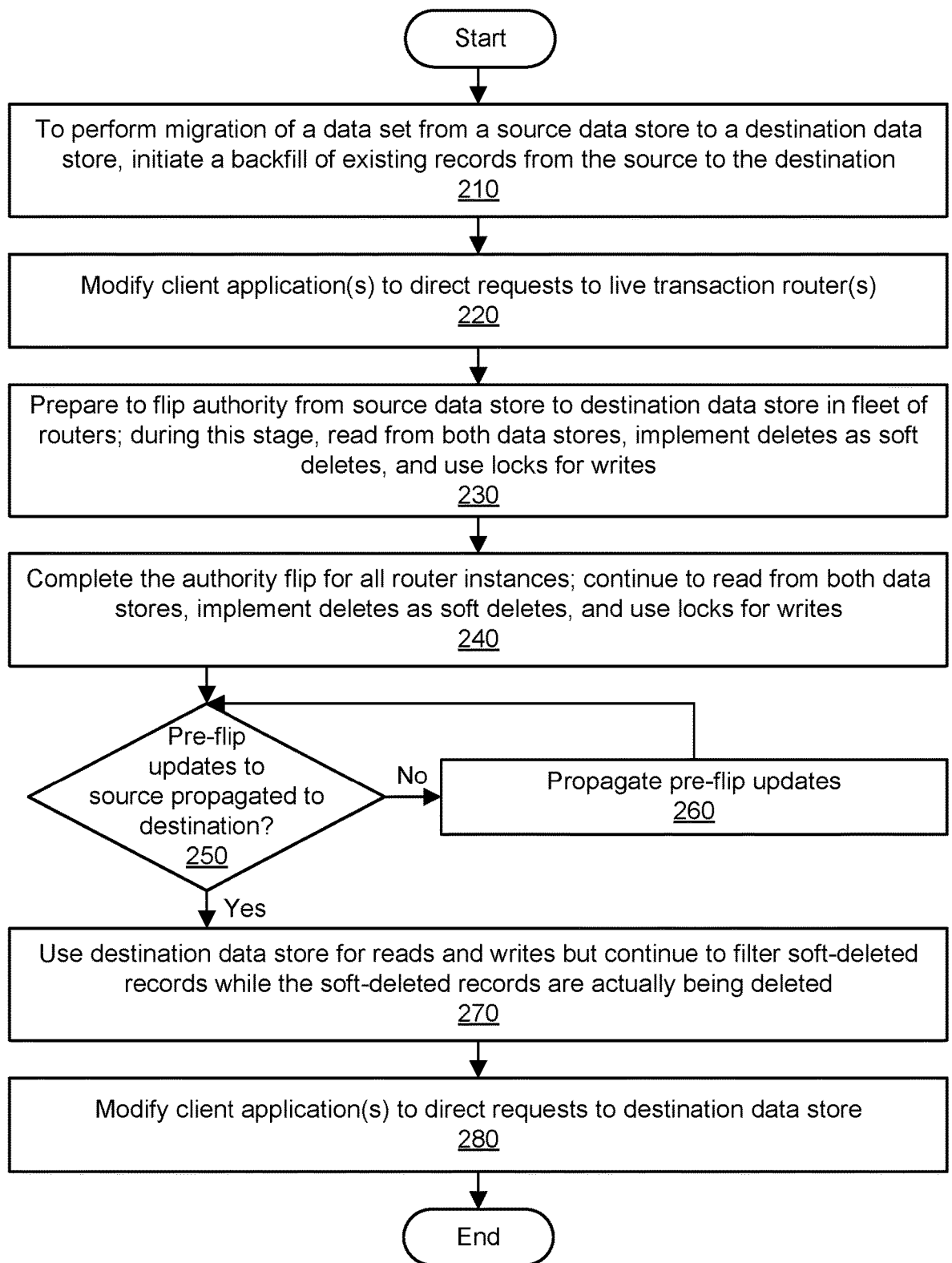
FIG. 2 is a flowchart illustrating a method for live migration for highly available data stores, according to some embodiments.

FIG. 2 is a flowchart illustrating a method for live migration for highly available data stores, according to some embodiments. As shown in 210, to perform migration of a data set from a source data store to a destination data store, a backfill of existing records may be initiated from the source to the destination. As shown in 220, one or more client applications may be modified to direct requests to one or more live transaction routers as an endpoint rather than one of the data stores. This modification may be part of a process referred to as onboarding. The routers may enable client applications to access the data set during migration. Suitable requests may include read requests, write requests, delete requests, and so on. Requests may be processed by the routers based (at least in part) on the particular stage of the migration. During the operation shown in 220, the source data store may be considered the authoritative data store for the migrating data set by all of the routers. Updates may be propagated asynchronously to the non-authoritative or secondary data store. The live migration system may permit gradual dialup of updates to the destination. By dialing up updates to the destination data store, clients may test the performance and availability of the destination data store before finalizing the migration.

As shown in 230, the method may prepare to flip the authority for the data set from the source data store to the destination data store. During this stage of the migration, a router may process reads by reading (or attempting to read) from both data stores and returning the authoritative version of the requested record. During this stage, a router may process writes using locks and also by determining the authoritative version of records. Locks may ensure that the state of a record does not change in the other data store during a write, e.g., if two routers differ on which data store is authoritative. During this stage, deletes may be implemented as soft deletes, and a record with at least one version having soft-deletion metadata may be considered deleted if a read request is received for the record.

As shown in 240, the authority flip may be performed for the entire router fleet, such that every router considers the destination data store to be the authoritative data store for the data set. The authority flip may take place on a router-by-router basis during a window of time and not concurrently across the entire fleet of routers. During this stage of the migration, routers may continue to process read requests by reading (or attempting to read) from both data stores, may process writes using locks, may process deletes using soft-deletion metadata rather than record deletion, and may filter soft-deleted records.

Before the authority flip was completed for the entire router fleet, un-flipped routers that considered the source data store to be authoritative may have updated the source data store, e.g., by inserting new records. As shown in 250, the method may determine whether all pre-flip updates to the source data store have been propagated to the destination data store. In one embodiment, a data reconciler component may be used to determine whether the destination data store has been properly updated. If not, then as shown in 260, the pre-flip updates to records may be propagated to the destination data store.

As shown in 270, the destination data store may be used exclusively for reads and writes. However, the routers may continue to filter soft-deleted records while the soft-deleted records are actually removed from the destination data store using a cleanup component. As shown in 280, the client application(s) may be modified to provide requests to the destination data store as an endpoint and not to the routers. This modification may be part of a process referred to as offboarding. State transitions for the live migration process illustrated in FIG. 2 are discussed below with reference to FIG. 10.

Figure 3:
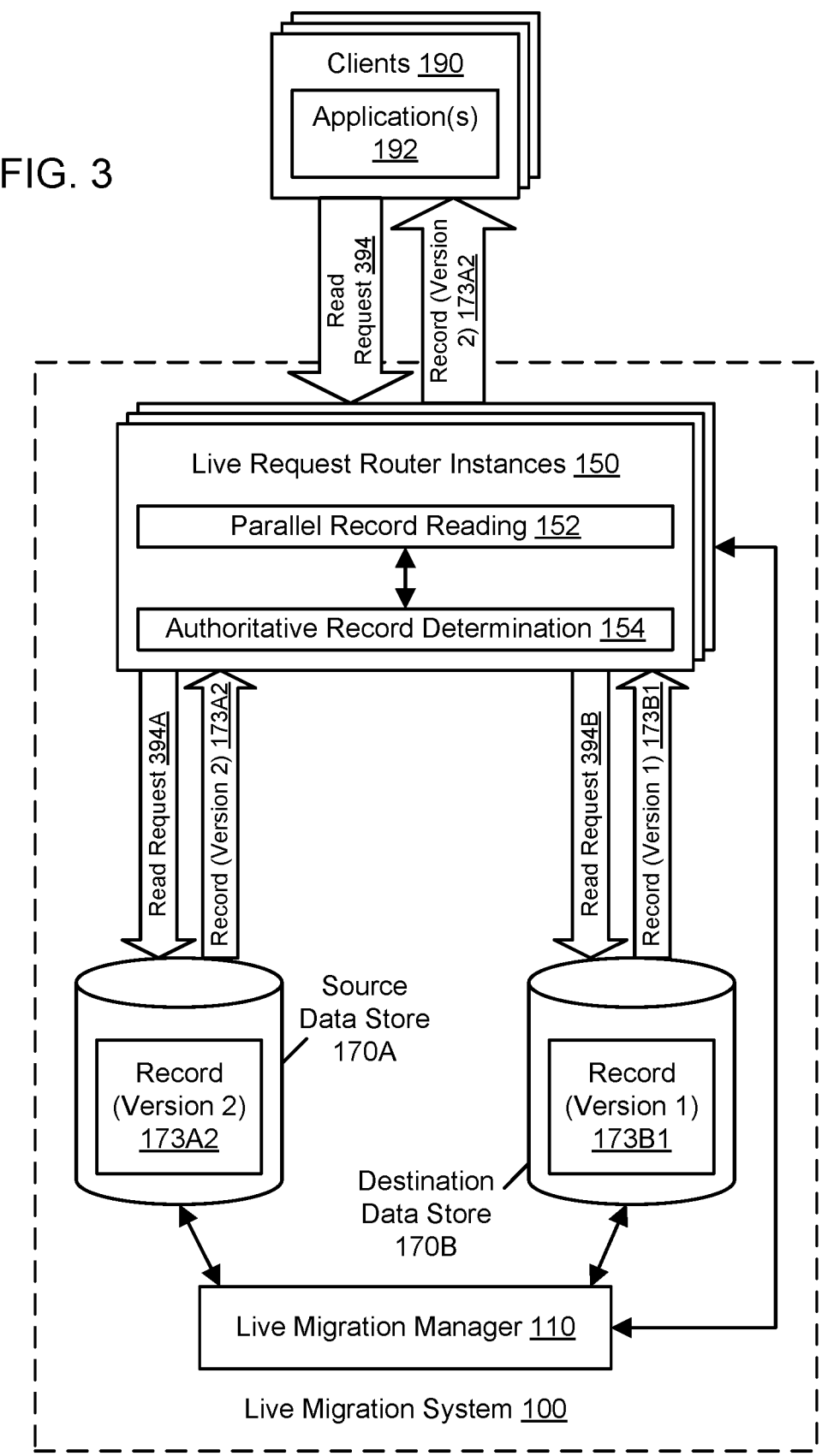
FIG. 3 illustrates further aspects of the example system environment for live migration for highly available data stores, including a multi-data-store read during migration, according to some embodiments.

FIG. 3 illustrates further aspects of the example system environment for live migration for highly available data stores, including a multi-data-store read during migration, according to some embodiments. During the window of time for the authority flip, in which routers may differ as to which data store is authoritative, reads may use both data stores to ensure that the newer and authoritative version of a record is returned to the client. As shown in FIG. 3, an application 192 may provide a read request 394 to a router instance 150. Using the component for parallel record reading 152, the router 150 may send read requests 394A and 394B to the source data store 170A and destination data store 170B, respectively. The requests 394A and 394B may be sent in parallel or concurrently, e.g., such that both requests are sent by a router 150 before a response to either request has been returned. The source data store 170A may return its version of the record (version 2) 173A2, while the destination data store 170B may return its version of the record (version 1) 173A1. The component for authoritative record determination 154 may conclude that record 173A2 is newer than the record 173A1 as indicated by their corresponding record metadata, e.g., using a time-based entry in the header or a payload attribute. The router instance 150 may thus return the newer and authoritative version of the record, record 173A2, to the application that sent the read request 394.

Figure 4:
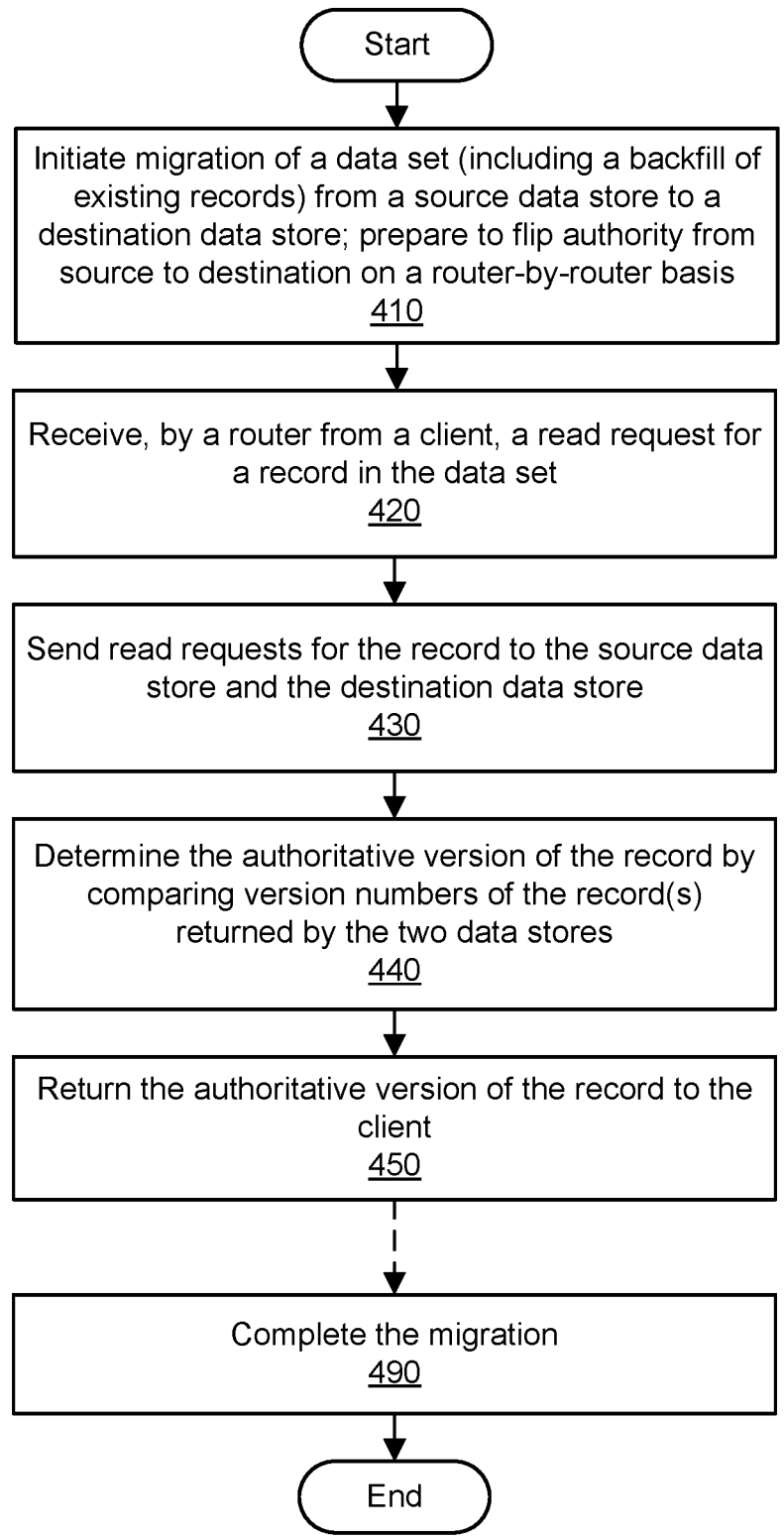
FIG. 4 is a flowchart illustrating a method for live migration for highly available data stores, including a read from multiple data stores during migration, according to some embodiments.

FIG. 4 is a flowchart illustrating a method for live migration for highly available data stores, including a read from multiple data stores during migration, according to some embodiments. As shown in 410, migration of a data set may be initiated from a source data store to a destination data store. The migration may include a backfill of existing records such that the records are replicated to the destination while remaining in the source. In one embodiment, after the backfill is completed, the method may prepare to flip authority for the data set from the source to the destination. The authority flip may be performed for each router in a fleet of routers, but individual routers may be affected at different times. During this window of time, reads from the data set may involve both data stores.

As shown in 420, a read request for a record in the data set may be received by a router from a client. As shown in 430, the router may send read requests for the record to the source data store and also to the destination data store. The source data store may respond with its version of the record (if present), and the destination data store may respond with its version of the record (if present). As shown in 440, the router may determine the authoritative version of the record by comparing the version numbers of any records returned by the two data stores. Version numbers may increase over time such that higher versions are newer than older versions. Newer versions may be considered authoritative over older versions. As shown in 450, the router may return the authoritative version of the record to the client that sent the read request.

As shown in 490, the migration may be completed at some point following the operation shown in 450. The migration may be completed only after all of the routers have successfully flipped authority from the source to the destination. State transitions for a migration are discussed in greater detail with reference to FIG. 10.

Figure 5A:
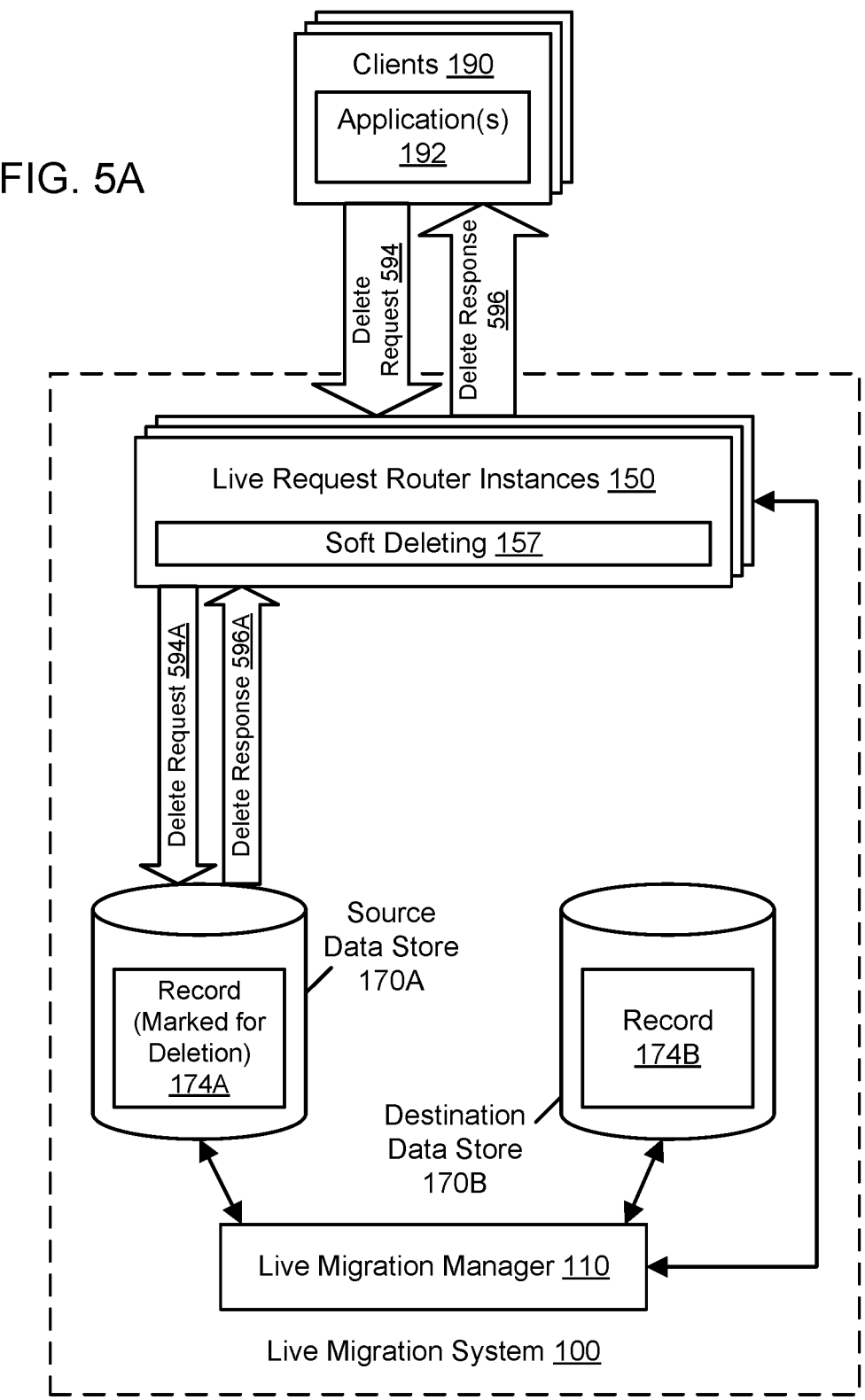
FIG. 5A and FIG. 5B illustrate further aspects of the example system environment for live migration for highly available data stores, including "soft" deletes during migration, according to some embodiments.
Figure 5B:
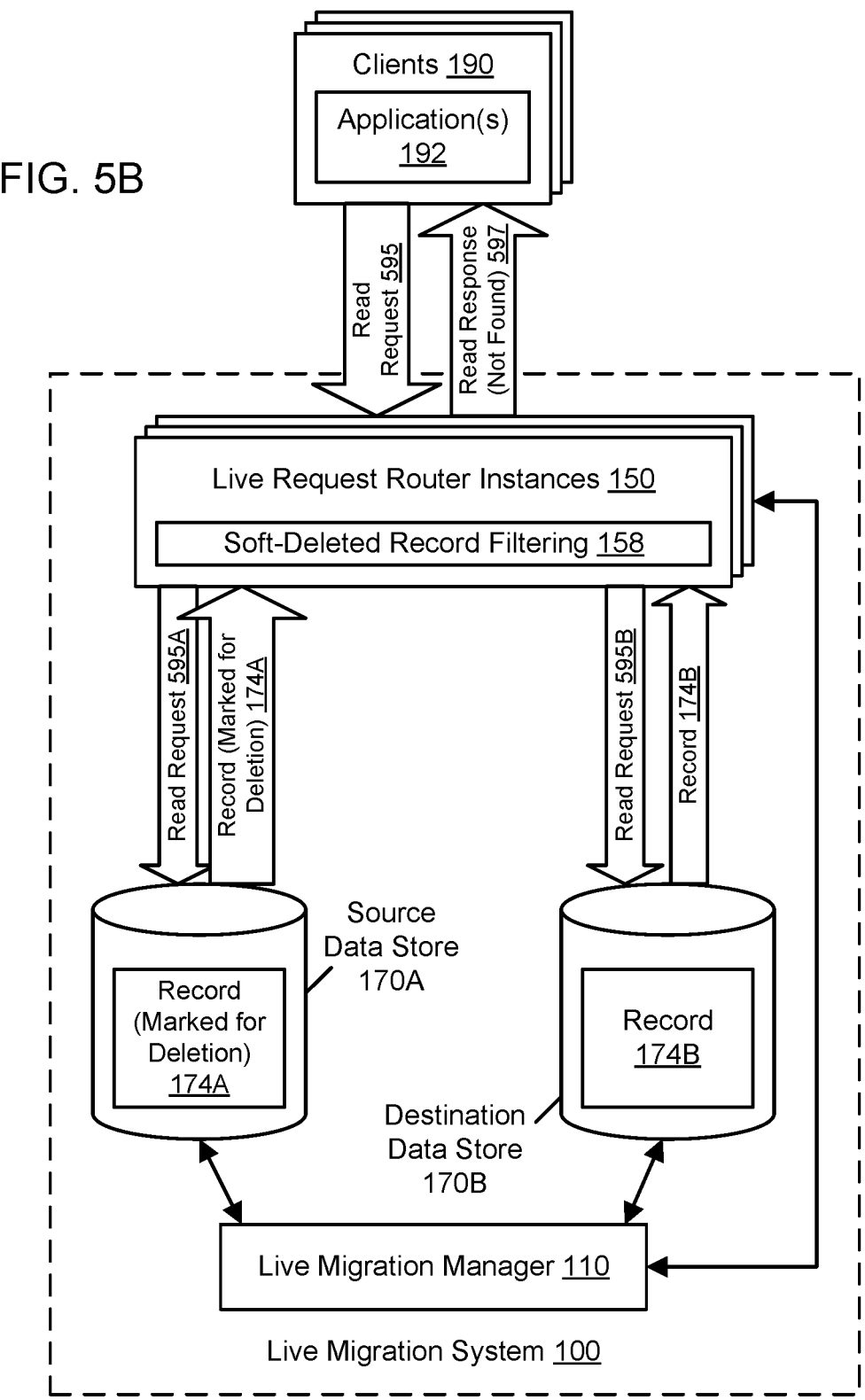

FIG. 5A and FIG. 5B illustrate further aspects of the example system environment for live migration for highly available data stores, including "soft" deletes during migration, according to some embodiments. During the window of time for the authority flip, in which routers may differ as to which data store is authoritative, delete requests may be processed by "soft" deleting records. Soft deletion may include leaving the record in the data store but marking the record as deleted, e.g., using metadata associated with the record. Soft deletion may also be referred to as tombstoning. Soft-deleted records may be filtered during reads, as if the records had actually been deleted. By marking records as deleted but not actually removing them until the migration is complete, rollbacks may be permitted without the need for a time-consuming reverse migration.

As shown in FIG. 5A, an application 192 may provide a delete request 594 to a router instance 150. Using a component for soft deleting 157, the router 150 may send a soft delete request 594A to the primary data store, e.g., the source data store 170A. The source data store 170A may implement the soft delete by adding metadata to the record 174A to indicate that the record is marked for deletion. The soft-deletion metadata may be part of a header for the record or a payload attribute. The source data store 170A may return a delete response 596A that indicates that the record was successfully soft deleted. The router may, in turn, return a delete response 596 to the application to indicate that the record was deleted. The soft deletion may be transparent to the requesting application. In one embodiment, the version of the record 174B in the secondary data store 170B may be soft-deleted asynchronously at a later point in time. However, a read request for the record may be received before the record 174B is deleted. Accordingly, the routers 150 may perform filtering of soft-deleted records.

As shown in FIG. 5B, an application 192 may provide a read request 595 to a router instance 150. Using the component for parallel record reading 152, the router 150 may send parallel read requests 595A and 595B to the source data store 170A and destination data store 170B, respectively. The source data store 170A may return its soft-deleted version of the record 174A, while the destination data store 170B may return its undeleted version of the record 174B. The component for soft-deleted record filtering 158 may observe that record 174A has the soft-deletion metadata. The router instance 150 may thus return, to the requesting application, a read response 597 indicating that the requested record was not found because at least one copy of the record was soft-deleted.

Figure 6:
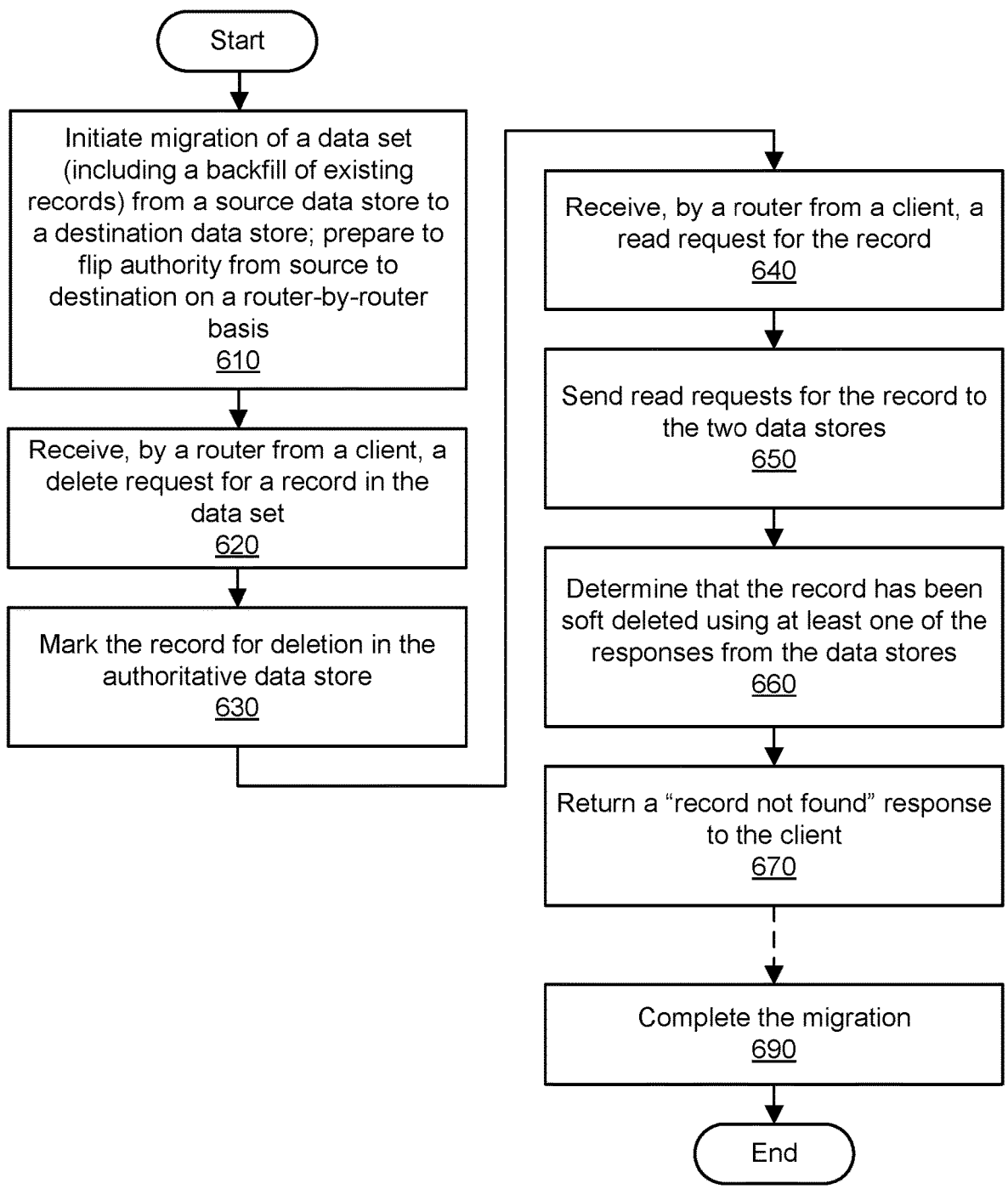
FIG. 6 is a flowchart illustrating a method for live migration for highly available data stores, including "soft" deletes during migration, according to some embodiments.

FIG. 6 is a flowchart illustrating a method for live migration for highly available data stores, including "soft" deletes during migration, according to some embodiments. As shown in 610, migration of a data set may be initiated from a source data store to a destination data store. The migration may include a backfill of existing records. In one embodiment, after the backfill is completed, the method may prepare to flip authority for the data set from the source to the destination. The authority flip may be performed for each router in a fleet of routers, but individual routers may be affected at different times. During this window of time, deletes may be performed as "soft" deletes. As shown in 620, a delete request for a record in the data set may be received by a router from a client. As shown in 630, the router may cause the record to be marked for deletion in the primary (authoritative) data store by adding soft-deletion metadata but not removing the record.

In one embodiment, the version of the record in the other (secondary) data store may be soft-deleted asynchronously at a later point in time. However, a read request for the record may be received before the other version of record is deleted. As shown in 640, a read request for the record may be received by a router from a client. As shown in 650, the router may send read requests for the record to the source data store and also to the destination data store. The source data store may respond with its version of the record, and the destination data store may respond with its version of the record. As discussed above, at least one of the versions may include the soft-deletion metadata. As shown in 660, the router may determine that the record has been soft-deleted based (at least in part) on the presence of the soft-deletion metadata. As shown in 670, the router may return a "record not found" response to the client that sent the read request.

As shown in 690, the migration may be completed at some point following the operation shown in 670. The migration may be completed only after all of the routers have successfully flipped authority from the source to the destination. State transitions for a migration are discussed in greater detail with reference to FIG. 10.

Figure 7A:
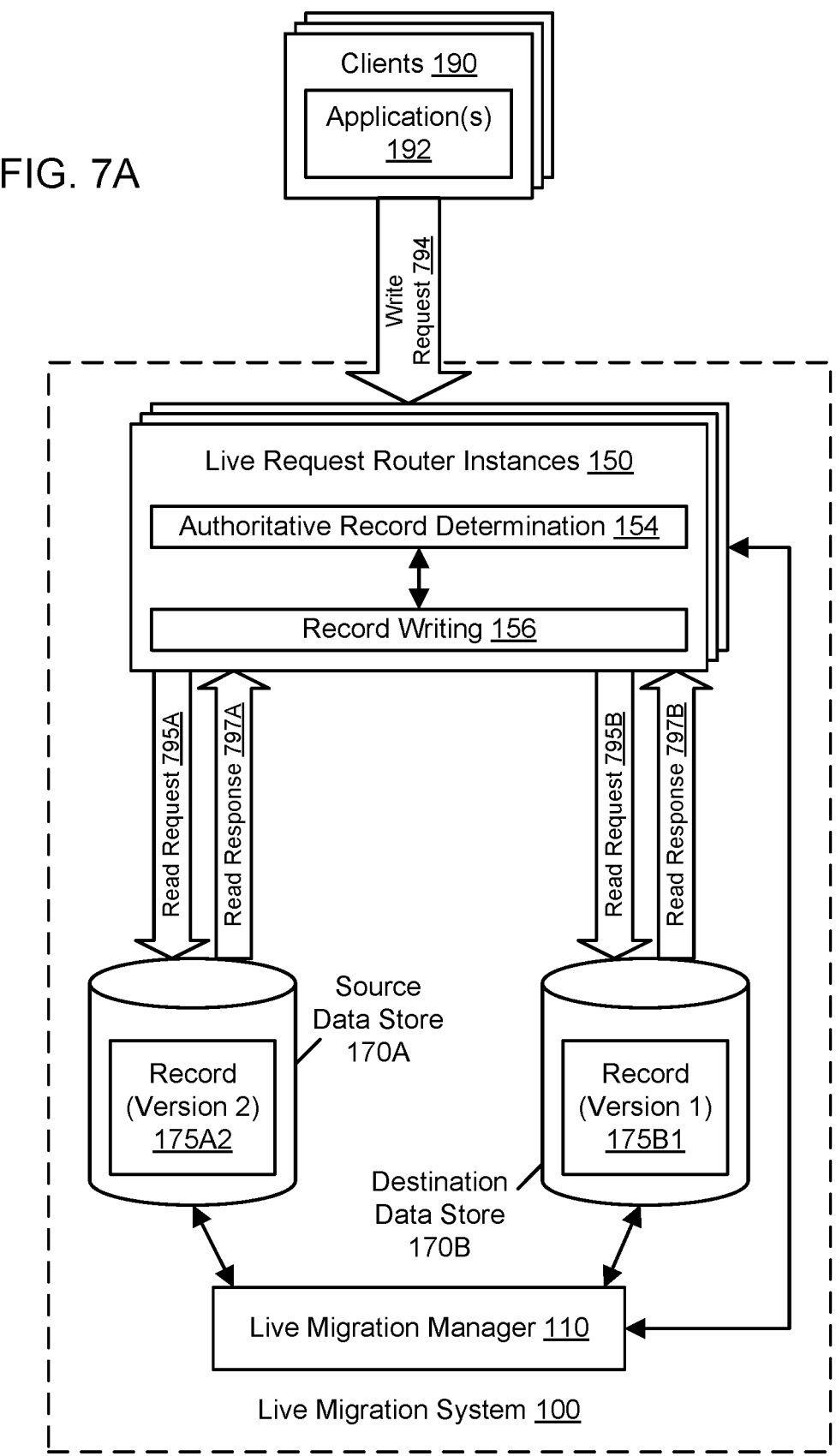
FIG. 7A and FIG. 7B illustrate further aspects of the example system environment for live migration for highly available data stores, including writes during migration, according to some embodiments.
Figure 7B:
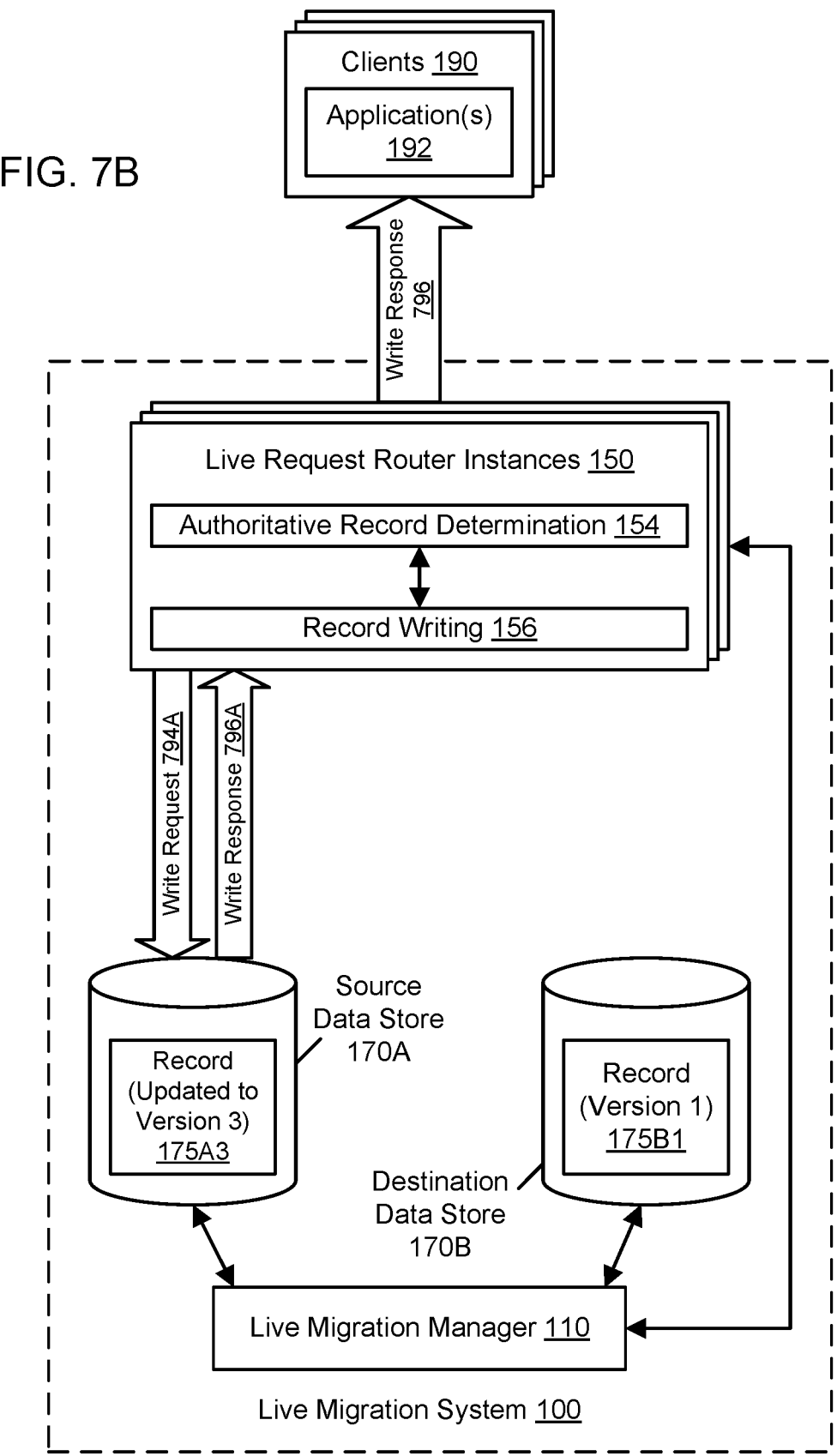

FIG. 7A and FIG. 7B illustrate further aspects of the example system environment for live migration for highly available data stores, including writes during migration, according to some embodiments. During the window of time for the authority flip, in which routers may differ as to which data store is authoritative, writes may be performed using locks. Upon receiving a write request, a router instance may acquire a lock on a record (e.g., a key) to be written. In one embodiment, a lock record may be created in the data store using the same key as the record being locked. The lock record may include information about the router instance that owns the lock and may be used in cleanup of locks in case the router fails to release the lock correctly. A locked write may make concurrent write requests on the same record fail, e.g., for the request that does not have the lock. The failure may be reported to the client application as a retriable error, and the failed request may be resubmitted and performed successfully after the lock has been released on behalf of the other request.

Because routers may differ in which data store they deem to be authoritative at this stage of the migration, the router may read the record from both data stores to determine if the secondary data store has a newer version of the record. If so, the router may copy the newer version from the secondary data store to the primary data store before performing the write. As shown in FIG. 7A, an application 192 may provide a write request 794 to a router instance 150. The router 150 may send parallel read requests 795A and 795B to the source data store 170A and destination data store 170B, respectively, to determine the newer version of the record. The source data store 170A may return its version of the record (version 2) 175A2, while the destination data store 170B may return its version of the record (version 1) 175B1. The component for authoritative record determination 154 may observe that record 174A2 is newer and thus authoritative. If the router considers the destination data store 170B to be the primary data store at this time, then the router may copy the newer version of the record 175A2 to that data store 170B.

Using this technique, a conditional expression associated with the write may be properly evaluated using the newest version of the record. As shown in FIG. 7B, the router may use a component for record writing 156 to perform the write on the primary data store 170A. The write may update the record to a new version 175A3. In one embodiment, the new version may be copied asynchronously to the other data store 170B. The primary data store 170A may provide a write response 796A that acknowledges a successful write, and the router 150 may, in turn, provide a write response 796 to the requesting application 192.

Figure 8:
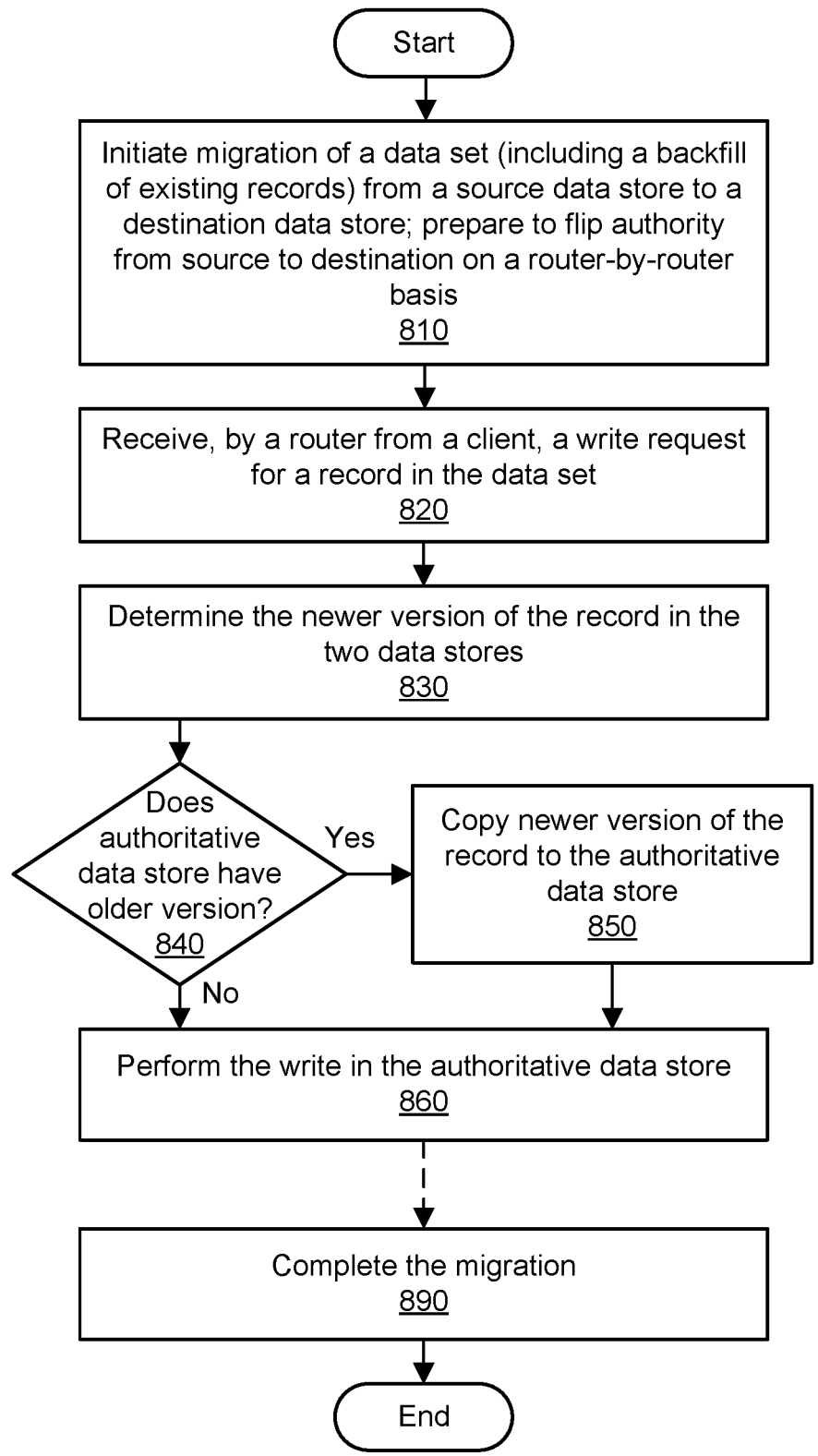
FIG. 8 is a flowchart illustrating a method for live migration for highly available data stores, including writes during migration, according to some embodiments.

FIG. 8 is a flowchart illustrating a method for live migration for highly available data stores, including writes during migration, according to some embodiments. As shown in 810, migration of a data set may be initiated from a source data store to a destination data store. The migration may include a backfill of existing records. In one embodiment, after the backfill is completed, the method may prepare to flip authority for the data set from the source to the destination. The authority flip may be performed for each router in a fleet of routers, but individual routers may be affected at different times. During this window of time, writes to the data set may involve both data stores and may be performed using locks.

As shown in 820, a write request for a record may be received by a router from a client. As shown in 830, the router may determine the newer version of the record in the source and destination data stores. As shown in 840, the router may determine whether the data store that it currently considers to be authoritative has an older version of the record. If so, then as shown in 850, the newer version of the record may be copied to the authoritative (primary) data store. As shown in 860, the write may be performed on the newer version of the record in the authoritative data store. A conditional expression associated with the write may thus be evaluated using the most up-to-date version of the record. As discussed above, write requests may be performed using per-record locks to prevent concurrent write requests on the same record from placing the record in an ambiguous, erroneous, or unexpected state.

As shown in 890, the migration may be completed at some point following the operation shown in 860. The migration may be completed only after all of the routers have successfully flipped authority from the source to the destination. State transitions for a migration are discussed in greater detail with reference to FIG. 10.

In one embodiment, locked writes may be performed conditionally or unconditionally during an authority flip according to the following pseudocode:

```
acquire lock for the specific key being written;
read versions of this key from both stores;
if (((recordDoesNotExist||latestRecordTombstoned) &&
    (conditional publish))
   ||(version being written<=higher of existing versions))
      {fail the publish request;
}
else {
   if (conditional write && secondary has higher version)
      copy higher version to primary;
   apply the write to primary store;
}
release the lock;
```

In one embodiment, deletes may be performed conditionally or unconditionally during an authority flip according to the following pseudocode:

```
acquire lock for the specific key being written;
read versions of this key from both stores;
if ((key not present in either store) || (highest version is tombstoned) {
   if (conditional delete) {
      fail the request; // since conditional deletes are not idempotent
   }
   else {
      // no action on stores
      return success;
   }
}
else {
   // Soft delete done in destination to retain complete control on clean-up
   if (conditional delete) {
      if (secondary has higher version)
         copy higher version to primary;
      increment the higher version;
      perform PutItem on destination store with:
         {condition = conditional delete expression,
         payload = {"Deleted":true,
```

```
    "HWRVersion":"%incremented_version>"}}
  }
  else {
    increment the higher version;
    perform PutItem on destination store with:
      {payload = {"Deleted":true,
        "HWRVersion":"<incremented_version>"}}
  }
}
```

Figure 9:
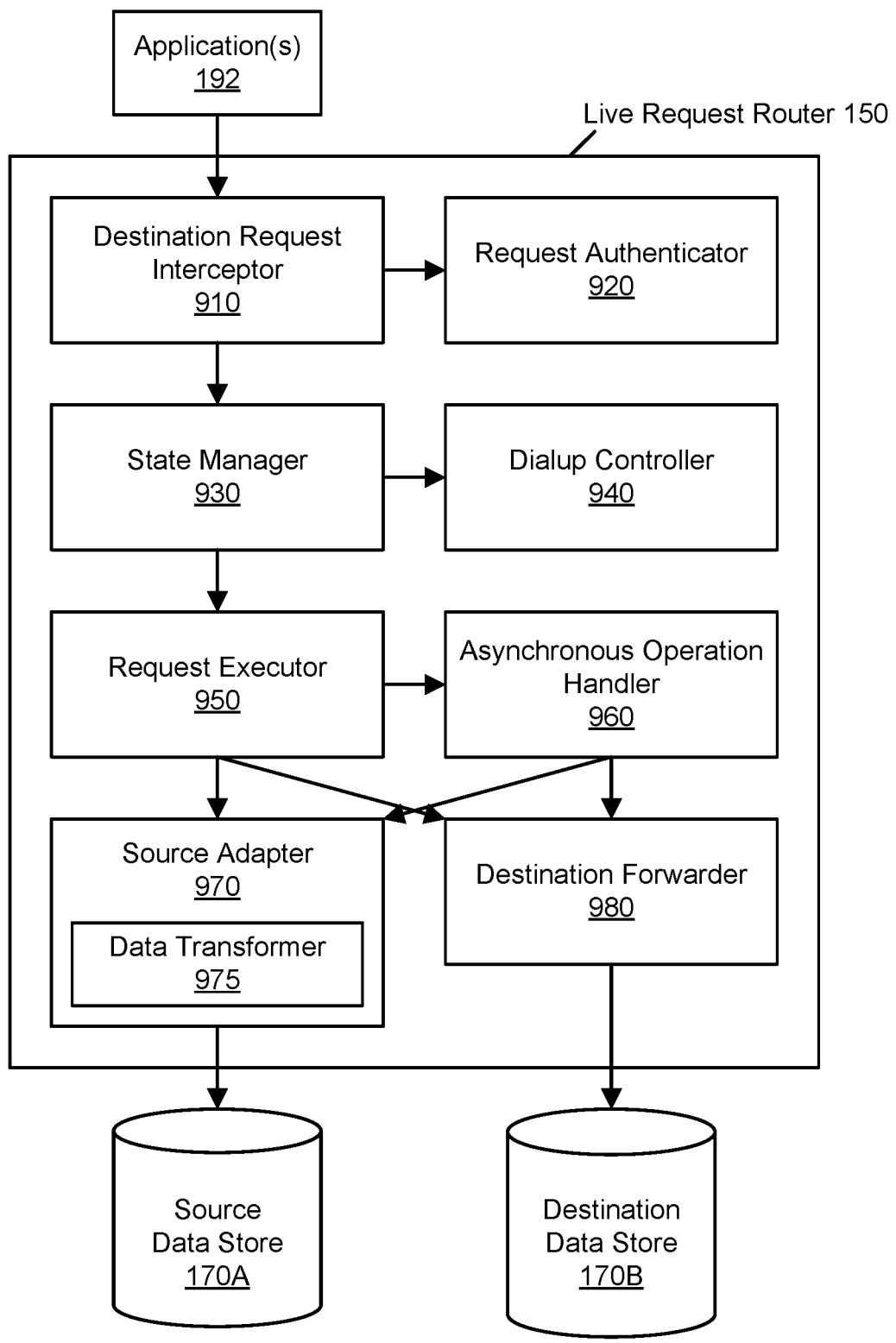
FIG. 9 illustrates further aspects of the example system environment for live migration for highly available data stores, including components of a live request router, according to some embodiments.

FIG. 9 illustrates further aspects of the example system environment for live migration for highly available data stores, including components of a live request router, according to some embodiments. As discussed above, a fleet of router instances 150 may permit a data set to be accessible to clients during a migration of the data set while minimizing application downtime. As shown in FIG. 9, a variety of components may enable a router 150 to intercept read/write/delete requests meant for the destination data store 170B from the client application, route them initially to the source data store 170A, and gradually shift traffic to the destination data store 170B. In one embodiment, an application 192 may be modified to point to the router 150 rather than to the source data store 170A or destination data store 170B during at least a portion of the migration. In one embodiment, the router 150 may include a destination request interceptor 910 that intercepts requests to an API of the destination data store 170B. A request authenticator 920 may authenticate the source of such requests. A state manager 930 may determine the treatment of the request based on the state of the migration. Migration states are discussed in greater detail with respect to FIG. 10. A dialup controller 940 may gradually increase the amount of traffic directed to the destination data store 170B and may thus control state changes in the migration. A request executor 950 may handle synchronous operations, such as performing writes using the primary data store 170A. An asynchronous operation handler 960 may handle asynchronous operations, such as replicating writes to the secondary data store 170B. A source data store adapter 970 may use a data transformer 975 to convert requests from the destination type to the source type and forward the transformed requests. A destination forwarder 980 may forward incoming requests to the destination data store 170B.

The data transformer 975 may perform source-to-destination transformation and/or destination-to-source transformation. The reverse data transformation may be performed in the live transaction routing path where destination calls are sent to the source data store 170A. In such circumstances, a data transformation strategy may include building transformation capability to and from all supported data formats to a common intermediate data format that is a superset of other formats. Once a transformation capability is built between a given data format and the intermediate format, it can be used for any transformation from or to that given format. In one embodiment, any schema transformation may be performed on the intermediate format so that it is independent of the source-destination pair.

Figure 10:
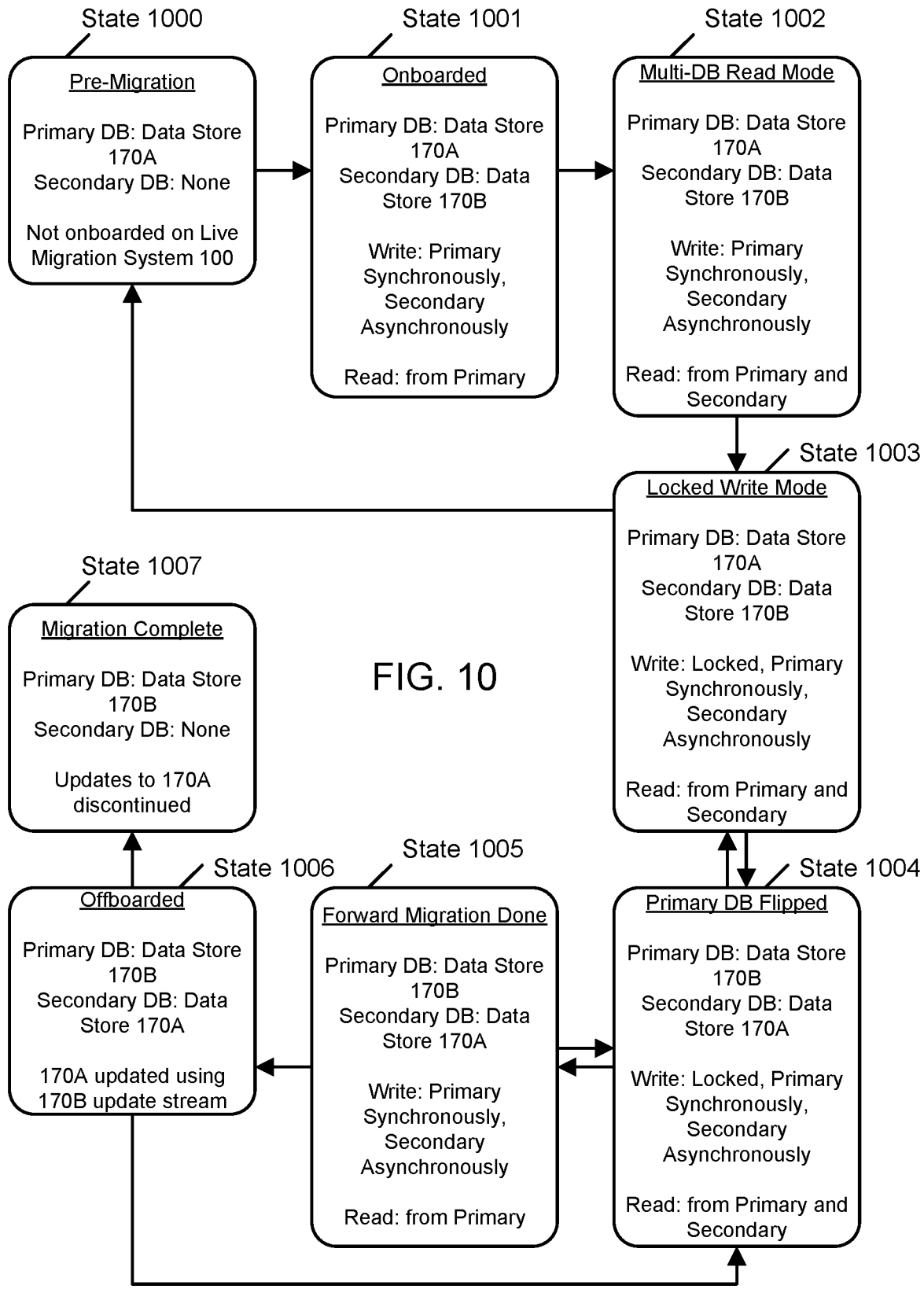
FIG. 10 is a state diagram illustrating various states of live migration for highly available data stores, according to some embodiments.

FIG. 10 is a state diagram illustrating various states of live migration for highly available data stores, according to some embodiments. State 1000 represent a pre-migration state. In state 1000, the primary database is the source data store 170A, and there is no secondary database. A client application is not onboarded on the live migration system 100 and routes its requests to the data store 170A rather than to the live request routers 150. To transition to the next state, a client registers with the system 100, creates the resources required for migration, and/or sets up appropriate permissions for migration. A data transformation from the source to the destination may be defined, e.g., for the initial backfill 122. In one embodiment, the backfill 122 may be performed during state 1000. During state 1000, the router instances 150 for the migration may be provisioned and configured.

State 1001 represents an onboarded state. In state 1001, the application is onboarded on the live migration system 100 and routes its requests to the live request routers 150 rather than to the data store. In state 1001, the primary database is the source data store 170A, and the secondary database is the destination data store 170B. Writes are performed synchronously to the primary database and asynchronously to the secondary database. Reads are performed using the primary database.

State 1002 represents a multi-database read mode. In state 1002, the primary database is the source data store 170A, and the secondary database is the destination data store 170B. Writes are performed synchronously to the primary database and asynchronously to the secondary database. Reads are performed using both the primary database and secondary database so that the newest version is returned. Soft-deleted records are filtered for reads. In one embodiment, the state diagram may transition to state 1002 at the start of the window of time in which the authority flip is propagated across the router fleet.

State 1003 represents a locked write mode. In state 1003, the primary database is the source data store 170A, and the secondary database is the destination data store 170B. In state 1003, writes are performed using per-record locks so that only one request can be performed on a given record until the lock is released. Write requests that are denied to due to locks may be retried. Writes are performed synchronously to the primary database and asynchronously to the secondary database. Reads are performed using both the primary database and secondary database so that the newest version is returned. Soft-deleted records are filtered for reads. In state 1003, the authority flip begins for the routers.

State 1004 represents a primary database flipped state. In state 1004, all the routers have been flipped. In state 1004, the primary database is the destination data store 170B, and the secondary database is the source data store 170A. Locked writes are performed synchronously to the primary database and asynchronously to the secondary database. Reads are performed using both the primary database and secondary database so that the newest version is returned. Soft-deleted records are filtered for reads while actual deletion of soft-deleted records is performed. In state 1004, a second backfill may be performed from the source to the destination so that updates after the first backfill are represented in the destination, and a data reconciler may verify that records in the destination have version numbers greater than or equal to the corresponding records in the source.

State 1005 represents a forward migration done state. In state 1005, the primary database is the destination data store 170B, and the secondary database is the source data store 170A. Writes are performed synchronously to the primary database and asynchronously to the secondary database. Reads are performed from the primary database only. Soft-deleted records may no longer be filtered for reads because all the soft-deleted records have been actually deleted.

State 1006 represents an offboarded state. In state 1006, the client application routes its requests to the data store 170A rather than to the live request routers 150. In state 1065, the primary database is the destination data store 170B, and the secondary database is the source data store 170A. The secondary database is updated using an update stream from the primary database. In state 1006, decommissioning of the router fleet is scheduled. The client may confirm that rollback to the source is not desired. State 1007 represents a migration complete state. In state 1007, the primary database is the destination data store 170B, and there is no secondary database. In state 1007, updates to the secondary database are discontinued.

In one embodiment, a rollback may be initiated at several of the states in order to return to the initial state 1000. For example, the rollback may proceed from state 1006 or state 1005 to state 1004, from state 1004 to state 1003, and from state 1003 to state 1000. By maintaining the source data store 170A in sync with the destination data store 170B, including the use of soft deletes, rollbacks may be performed efficiently without the need for a time-consuming backfill from the destination to the source.

Illustrative Computer System

In at least some embodiments, a computer system that implements a portion or all of one or more of the technologies described herein may include a computer system that includes or is configured to access one or more computer-readable media. FIG. 11 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a source data store;
   a destination data store; and
   a plurality of computing devices configured to implement a live migration system comprising a plurality of routers, wherein the live migration system is configured to:
   initiate a migration of a data set from the source data store to the destination data store, wherein the migration comprises a backfill of existing records in the data set from the source data store to the destination data store;
   begin updating the routers to indicate that the destination data store represents an authoritative data store for the data set, wherein the routers are updated individually during a window of time after the backfill;
   receive, from a client application, a read request for a first record in the data set, wherein the read request is received during the window of time;
   generate a response to the read request using a first copy of the first record in the source data store and a second copy of the first record in the destination data store, wherein the response to the read request comprises an authoritative version of the first record, and wherein the authoritative version of the first record is determined based at least in part on version metadata associated with the first copy of the first record and the second copy of the first record;
   receive, from the client application, a write request for a second record in the data set, wherein the write request is received during the window of time; and
   perform the write request using a first copy of the second record in the source data store and a second copy of the second record in the destination data store, wherein the write request is performed based at least in part on acquisition of a lock associated with the second record, and wherein the write request is performed based at least in part on version metadata associated with the first copy of the second record and the second copy of the second record.

2. The system as recited in claim 1, wherein the live migration system is further configured to:
   receive a delete request for a third record in the data set, wherein the delete request is received during the window of time;
   based at least in part on the delete request, modify metadata associated with the third record in the source data store to indicate that the additional record is deleted;
   receive an additional read request for the third record, wherein the additional read request is performed after the metadata associated with the third record is modified in the source data store and before the delete request is performed for the third record in the destination data store; and
   based at least in part on the metadata associated with the third record in the source data store, return a response to the additional read request indicating that the third record is deleted.

3. The system as recited in claim 1, wherein the live migration system is further configured to:
   initiate a rollback of the migration, wherein the rollback restores the source data store as the authoritative data store for the data set without performing a backfill from the destination data store to the source data store.

4. The system as recited in claim 1, wherein the write request is received by a first router of the plurality of routers, wherein the source data store represents the authoritative data store and the destination data store represents a non-authoritative data store to the first router, and wherein, in performing the write request, the live migration system is further configured to:
   determine a newer version of the second record in the non-authoritative data store;
   copy the newer version of the second record from the non-authoritative data store to the authoritative data store;
   perform the write request using the newer version of the second record in the authoritative data store; and
   asynchronously perform the write request in the non-authoritative data store.

5. A computer-implemented method, comprising:
   initiating a migration of a data set from a first data store to a second data store, wherein the migration comprises a backfill of existing records in the data set from the first data store to the second data store;
   receiving a read request for a first record in the data set, wherein the read request is received during a window of time before the migration is complete;
   generating a response to the read request using a first copy of the first record in the first data store and a second copy of the first record in the second data store, wherein the response to the read request comprises an authoritative version of the first record;
receiving a write request for a second record in the data set, wherein the write request is received during the window of time; and
performing the write request using a first copy of the second record in the first data store and a second copy of the second record in the second data store, wherein the write request is performed based at least in part on acquisition of a lock associated with the second record.

6. The method as recited in claim 5, further comprising:
receiving a delete request for a third record in the data set, wherein the delete request is received during the window of time before the migration is complete;
based at least in part on the delete request, modifying metadata associated with the third record in the first data store to indicate that the third record is deleted;
receiving an additional read request for the third record, wherein the additional read request is performed after the metadata associated with the third record is modified in the first data store and before the delete request is performed for the third record in the second data store; and
based at least in part on the metadata associated with the third record in the first data store, returning a response to the additional read request indicating that the third record is deleted.

7. The method as recited in claim 5, further comprising:
initiating a rollback of the migration, wherein the rollback restores the first data store as an authoritative data store for the data set without performing a backfill from the second data store to the first data store.

8. The method as recited in claim 5, wherein the authoritative version of the first record is determined based at least in part on version metadata associated with the first copy of the first record and the second copy of the first record, wherein the authoritative version represents a newer version of the first record.

9. The method as recited in claim 5, further comprising:
initiating an updating of a plurality of routers to indicate that the second data store represents an authoritative data store for the data set and the first data store represents a non-authoritative data store for the data set, wherein the routers are updated individually during the window of time, and wherein the data set is accessible to one or more clients during the migration.

10. The method as recited in claim 9, wherein the write request is received by a first router of the plurality of routers, wherein the first data store represents the authoritative data store and the second data store represents the non-authoritative data store to the first router, and wherein performing the write request further comprises:
determining, by the first router, a newer version of the second record in the non-authoritative data store;
copying, by the first router, the newer version of the second record from the non-authoritative data store to the authoritative data store;
performing the write request using the newer version of the second record in the authoritative data store; and
performing the write request in the non-authoritative data store.

11. The method as recited in claim 5, further comprising:
receiving an additional write request for the second record, wherein the additional write request is received before the migration is complete and while the lock associated with the second record is acquired for the write request;
denying the additional write request for the second record based at least in part on the lock; and
retrying the additional write request after the lock is released on behalf of the write request.

12. The method as recited in claim 5, further comprising:
initiating an additional backfill of one or more updated records from the first data store to the second data store, wherein the one or more updated records were updated during the window of time.

13. One or more non-transitory computer-readable storage media storing program instructions that, when executed on or across one or more processors, perform:
initiating a migration of a data set from a first data store to a second data store, wherein the migration comprises a backfill of existing records in the data set from the first data store to the second data store;
receiving, by a router in a router fleet, a read request for a first record in the data set, wherein the read request is received during a window of time after the backfill and before the migration is complete;
generating, by the router, a response to the read request using a first copy of the first record in the first data store and a second copy of the first record in the second data store, wherein the response to the read request comprises an authoritative version of the first record;
receiving, by the router, a write request for a second record in the data set, wherein the write request is received during the window of time; and
performing the write request using a first copy of the second record in the first data store and a second copy of the second record in the second data store, wherein the write request is performed based at least in part on version metadata associated with the first copy of the second record and the second copy of the second record.

14. The one or more non-transitory computer-readable storage media as recited in claim 13, further comprising additional program instructions that, when executed on or across the one or more processors, perform:
receiving a delete request for a third record in the data set, wherein the delete request is received during the window of time;
based at least in part on the delete request, modifying metadata associated with the third record in the second data store to indicate that the third record is deleted;
receiving an additional read request for the third record, wherein the additional read request is performed after the metadata associated with the third record is modified in the second data store and before the delete request is performed for the third record in the first data store;
based at least in part on the metadata associated with the third record in the second data store, returning a response to the additional read request indicating that the third record is deleted.

15. The one or more non-transitory computer-readable storage media as recited in claim 13, further comprising additional program instructions that, when executed on or across the one or more processors, perform:
initiating a rollback of the migration, wherein the rollback restores the first data store as an authoritative data store for the data set without performing a backfill from the second data store to the first data store.

16. The one or more non-transitory computer-readable storage media as recited in claim 13, wherein the authoritative version of the first record is determined based at least in part on version numbers associated with the first copy of the first record and the second copy of the first record, wherein the authoritative version represents a newer version of the first record.

17. The one or more non-transitory computer-readable storage media as recited in claim 13, further comprising additional program instructions that, when executed on or across the one or more processors, perform:
initiating an updating of a plurality of routers to indicate that the second data store represents an authoritative data store for the data set and the first data store represents a non-authoritative data store for the data set, wherein the routers are updated non-atomically during the window of time, and wherein the data set is accessible to one or more client applications during the migration.

18. The one or more non-transitory computer-readable storage media as recited in claim 17, wherein the write request is received by a first router of the plurality of routers, wherein the second data store represents the authoritative data store and the first data store represents the non-authoritative data store to the first router, and wherein performing the write request further comprises:
determining, by the first router, a newer version of the second record in the non-authoritative data store;
copying, by the first router, the newer version of the second record from the non-authoritative data store to the authoritative data store;
performing the write request using the newer version of the second record in the authoritative data store; and
asynchronously performing the write request in the non-authoritative data store.

19. The one or more non-transitory computer-readable storage media as recited in claim 13, further comprising additional program instructions that, when executed on or across the one or more processors, perform:
receiving an additional write request for the second record, wherein the additional write request is received before the migration is complete and while a lock associated with the second record is acquired for the write request;
denying the additional write request for the second record based at least in part on the lock; and
retrying the additional write request after the lock is released on behalf of the write request.

20. The one or more non-transitory computer-readable storage media as recited in claim 13, further comprising additional program instructions that, when executed on or across the one or more processors, perform:
initiating an additional backfill of one or more updated records from the first data store to the second data store, wherein the one or more updated records were updated during the window of time.

\* \* \* \* \*